Feb. 13, 1973   J. R. MORRISON   3,716,432
METHOD OF MAKING DECORATIVE ARTICLES EMPLOYING
STRIPS OF FLEXIBLE MATERIAL
Filed March 3, 1971

INVENTOR:
JOHN R. MORRISON
BY
Breitenfeld & Levine
ATTORNEYS 3,716,432
METHOD OF MAKING DECORATIVE ARTICLES EMPLOYING STRIPS OF FLEXIBLE MATERIAL
John R. Morrison, 350 E. 52nd St., New York, N.Y. 10022
Filed Mar. 3, 1971, Ser. No. 120,571
Int. Cl. B44d 5/06
U.S. Cl. 156—63        13 Claims

ABSTRACT OF THE DISCLOSURE

A base is provided having a pressure-sensitive adhesive coating on its surface. A portion of a narrow strip of flexible material is applied to the base surface, the remainder of the strip being held away from the surface. A knife blade is pressed against the strip to sever the adhered portion from the remainder. The base may bear indicia to indicate where the strip is to be placed and cut, and the type (e.g. color) of strip to be used. These steps are repeated using other strips, each strip being contiguous with at least one strip preceding it. A visual characteristic, such as color, of some strips differs from that of others of the strips, so that together all the strips produce a composite decorative effect. At least some of the strips are aligned with one or more other strips and arranged end-to-end with the other strips, and at least some are arranged side-by-side and parallel to other strips. The base may be rigid or flexible.

---

This invention relates generally to ornamentation, and has particular reference to a method of making decorative articles in which strips of flexible material, preferably of various colors, is the principal medium of ornamentation.

A general object of the invention is to provide a method of producing an ornamental article composed of narrow strips of flexible material, such as cloth, paper, foil, etc.

A more particular object is to provide such a method of simplified nature, intended for use by anyone, and not requiring special skill.

Additional objects and features of the invention will be apparent from the following description in which reference is made to the accompanying drawings.

Figure 1:
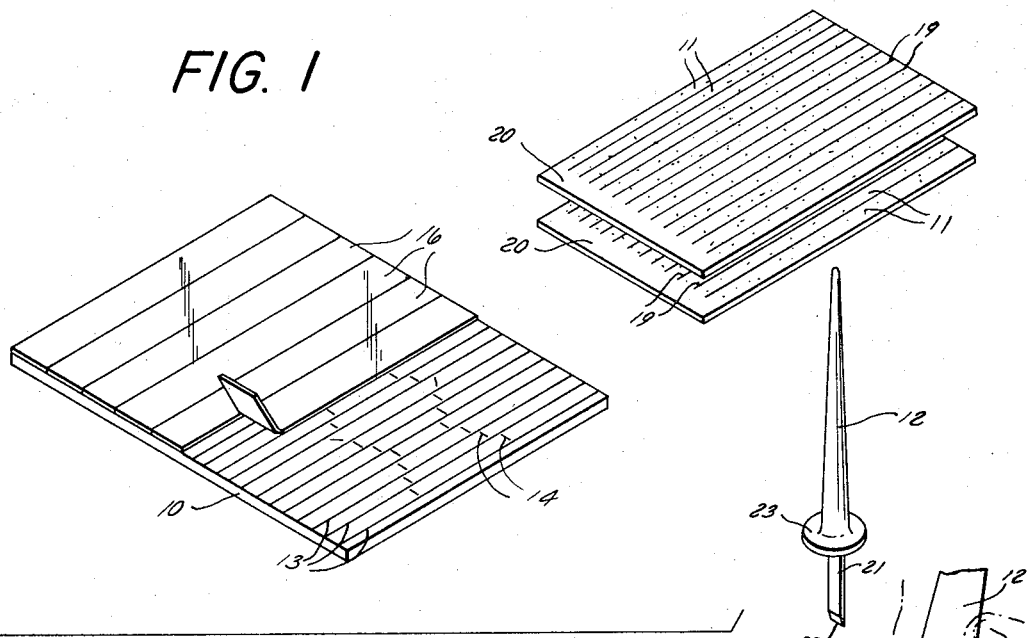
FIG. 1 is a perspective view of the components furnished to carry out the method, namely, a base, strips of flexible material, and a cutting tool.

The materials for carrying out the procedure comprises, as shown in FIG. 1, a base 10, strips 11 of flexible material, and a cutting tool 12.

The base 10 may be of rigid material, such as a thick cardboard, or it may be a flexible sheet, such as a suitable relatively stiff cloth. In either case, the base will ordinarily be supported on a rigid surface, such as a table top, while the method is being carried out. Preferably the upper surface of base 10 bears indicia, which may be printed on it, to guide the user in placement and cutting of the strips 11 on the base, and to indicate the type, e.g., color, of strip to be used. In the present example, the indicia include parallel lines 13 (FIGS. 1 and 2) spaced apart a distance equal to the width of strips 11, and shorter lines 14 arranged at an angle or angles to lines 13. In addition, each area defined by lines 13 and 14 may include a numeral as a guide to the type or color of strip to be used for covering that area.

The upper surface of base 10 is furnished, preferably over its entire area, with a pressure sensitive adhesive 15 (FIGS. 3–6). The adhesive should be transparent so as not to obscure the indicia carried by the base. Initially, the entire adhesive-coated surface of base 10 is covered by a protective layer of material readily peelable from it. According to the present invention, the protective layer is in the form of separate sections 16, each being several times as wide as one of the strips 11. As a result, the entire adhesively coated surface need not be uncovered at once. Instead, one section 16 is peeled off at a time to expose a portion of the base surface, and after that portion has been covered with strips 11, another section 16 is removed. In this way, the user may lean on the base as he works without coming into contact with the adhesive.

In the present example, strips 11 are made from sheet material, the sheets being cut along parallel lines 19 to define the strips 11. Cuts 19 extend from one edge of the sheet but terminate short of the opposite edge, so that the margin 20 along the latter edge interconnects all the strips. This expedient makes the strips 11 easy to handle, and keeps all the strips of the same color or type together. When a strip 11 is to be used, it is simply cut or torn from margin 20. FIG. 1 illustrates two groups of strips 11. The two groups may be of the same material, such as felt, but of different colors, or they may be of different materials or of materials having some other difference in visual characteristic so that they can produce a composite decorative effect. The strips are of a material which can readily be cut by tool 12.

Tool 12 has a handle and a flat blade 21 terminating in a knife edge 22. Preferably the length of knife edge 22 is about equal to or slightly larger than the width of each strip 11. An enlargement 23 at the end of the handle accommodating blade 21 aids the user in applying pressure in the longitudinal direction of blade 21 so that knife edge 22 can be used for cutting.

To embellish the adhesive-bearing upper surface of base 10, a section 16 of the protective layer is first removed. In FIG. 1, several of these sections have been removed, so that the surface beneath can be shown in full lines, and one section 16 is in the process of being removed. A strip 11 of appropriate color or type is then selected, the color or type selected depending on the numeral within the area, on the base surface, to be covered by the strip. Thus, for example, if the numeral 3 represents the color red, a red strip will be selected to cover the area 26 (FIG. 2).

Figure 4:
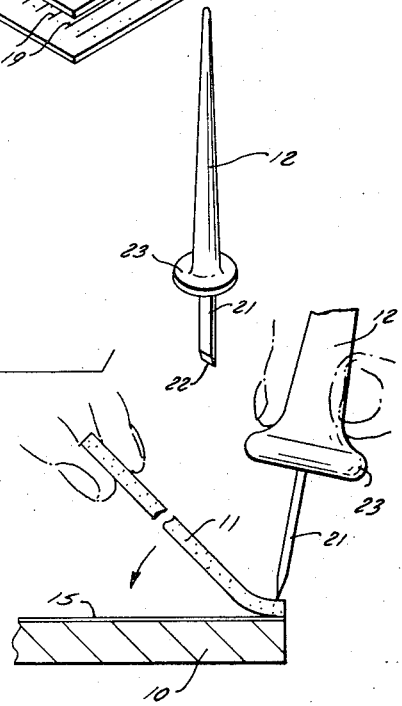
FIGS. 4, 5 and 6 are vertical cross-sectional views showing successive steps in the procedure.
Figure 5:
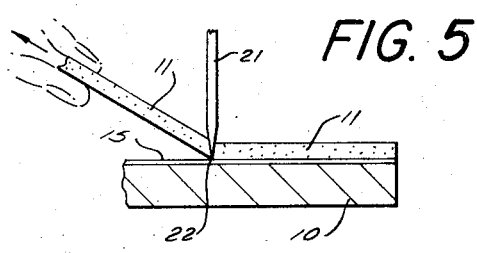

As shown in FIG. 4, the strip 11 is placed upon the adhesive layer 15 of base 10, with its end edge overlying either the edge of base 10 (as in FIG. 4) or overlying one of the lines 14. The end of the strip is then tapped lightly with tool 12 to cause its adherence to the base. The strip is pressed down against the base, in a longitudinal direction until it covers almost the entire area to be covered by it. The strip 11 will always be longer than the area to be covered, and the remainder of the strip not pressed against the base surface is held away from it, as shown in FIG. 5. The knife edge 22 of tool 12 is then placed directly over the line 14 indicating the end of the area to be covered by that strip, and the tool is pressed downwardly in a direction perpendicular to the plane of base 10, as shown in FIG. 5, to cut the strip. The remainder of the strip is of course removed from the base. The pressure-sensitive adhesive 15 firmly holds strip 11 on the base surface.

Figure 2:
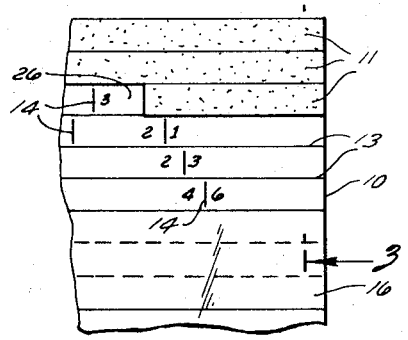
FIG. 2 is a plan view of the base showing several strips adhered to it.
Figure 3:
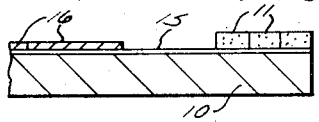
FIG. 3 is a cross-sectional view taken on line 3—3 of FIG. 2.
Figure 6:
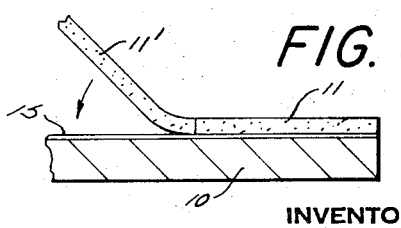

Assuming the strip 11 applied to base 10 does not extend all the way across the width of the base, as in the case with the third strip from the top in FIG. 2, another strip is placed in alignment with it. One end edge of this latter strip, identified as 11' in FIG. 6, is placed against the cut end edge of strip 11, and is applied to the base in the manner described above. Thus, in each horizontal row containing more than one strip, the strips are arranged contiguously end-to-end. Also, as indicated in FIGS. 2 and 3, the strips in adjacent rows are arranged contiguously side-by-side.

Figure 7:
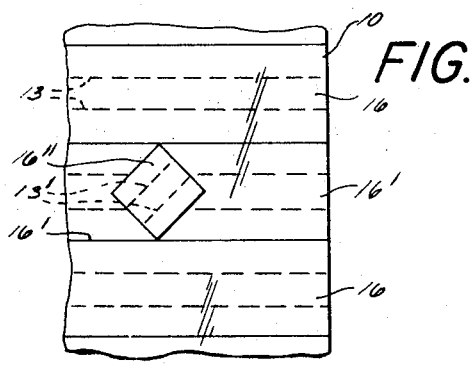
FIG. 7 is a plan view of an alternative embodiment of the base.

Although it is contemplated that most of the strips 11 will be arranged parallel to each other, as shown in FIG. 2, all the strips need not necessarily have this orientation. As shown in FIG. 7, base 10 may have parallel lines 13, as mentioned above, and may also have lines 13' arranged at an angle to lines 13. In the areas defined by lines 13', strips 11 will be placed at angles to strips within the areas defined by lines 13. In all other respects, application of the strips to the base, and cutting of the strips, is carried out as described above. It will be appreciated that the horizontal strips which meet the angled strips are cut at an angle so that the cut edges will lie in edge-to-edge engagement with the angled strips. This is accomplished simply by positioned tool 12 so that knife edge 22 engages strip 11 along the direction of the desired cut. It is also advantageous to make the portion of the protective layer covering the adhesive conform in shape to the area which will bear the angled strips. Thus, in FIG. 7, protective layer section 16'' is separate from the sections 16 and 16', so that it can be removed without disturbing the protective layer sections adjacent to it.

Some of the strips will ordinarily have a visual characteristic different from others. This visual characteristic may be color, texture, or some characteristic resulting from the use of different materials. Thus, the strips may all be of the same material, e.g., cloth, paper, foil, plastic, or the material of some strips may differ from that of others.

The invention has been shown and described in preferred form only, and by way of example, and many variations may be made in the invention which will still be comprised within its spirit. It is understood, therefore, that the invention is not limited to any specific form or embodiment except insofar as such limitations are included in the appended claims.

What is claimed is:

1. A method of making a decorative article, comprising the steps of
   (a) providing a base having a surface bearing a pressure-sensitive adhesive coating,
   (b) applying a portion of a narrow strip of flexible material to said surface so that the strip portion adheres thereto, the remainder of the strip being held away from said surface,
   (c) pressing a knife edge against the strip in the region of the strip between the portion adhering to said surface and the remainder of the strip, the knife pressure being in a direction perpendicular to the plane of said base surface to cut the strip to a desired length, and
   (d) repeating steps (b) and (c) using other strips of flexible material, each successive strip applied to said surface being contiguous with at least one strip preceding it, at least some of said strips having a visible characteristic different from others of said strips, whereby all of said strips together produce a composite decorative effect.

2. A method as defined in claim 1 wherein said base surface bears indicia indicating where each strip is to be cut.

3. A method as defined in claim 1 wherein said base surface bears indicia indicating where each strip is to be placed and cut.

4. A method as defined in claim 1 including the step of placing an end edge of each of at least some of the strips in engagement with the end edge of a preceding strip at the time each of said some strips is applied to said surface.

5. A method as defined in claim 1 including the step of placing a longitudinal edge of each of at least some of the strips in engagement with the longitudinal edge of a preceding strip at the time each of said some strips is applied to said surface.

6. A method as defined in claim 1 wherein said adhesive coating is covered by a protective layer divided into separate sections, and including the step of removing said sections one-at-a-time to progressively expose the adhesive coating.

7. A method as defined in claim 1 wherein the strips are cut along a line perpendicular to their longitudinal dimension.

8. A method as defined in claim 1 wherein the strips are cut along a line arranged at an acute angle to their longitudinal dimension.

9. A method as defined in claim 1 wherein at least some of said strips adhered to said surface are parallel to each other.

10. A method as defined in claim 1 wherein at least some of said strips adhered to said surface are arranged at an angle to some others of said strips adhered to said surface.

11. A method as defined in claim 1 wherein said base is rigid.

12. A method as defined in claim 1 wherein said base is a sheet of flexible material, said sheet being supported on a rigid surface until the decorative article has been completed.

13. A method as defined in claim 1 wherein said visible characteristic of said strips is color, the color of some of said strips being different from the color of others of said strips.

References Cited

UNITED STATES PATENTS 3,002,309   10/1961   Snyder _____ 156—63
3,503,835   3/1970    Herman _____ 161—38

EDWARD G. WHITBY, Primary Examiner

U.S. Cl. X.R.

156—250, 251, 299, 309; 161—38